US009207992B2

(12) United States Patent
Lu et al.

(10) Patent No.: US 9,207,992 B2
(45) Date of Patent: *Dec. 8, 2015

(54) METHODS AND APPARATUS FOR PROCESSING LOAD BALANCING IN DISTRIBUTED PROBLEM PROCESSING

(75) Inventors: Ligang Lu, New City, NY (US); Michael Peter Perrone, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 518 days.

This patent is subject to a terminal disclaimer.

(21) Appl. No.: 13/557,696

(22) Filed: Jul. 25, 2012

(65) Prior Publication Data

US 2013/0346999 A1     Dec. 26, 2013

Related U.S. Application Data

(63) Continuation of application No. 13/531,799, filed on Jun. 25, 2012.

(51) Int. Cl.
 G06F 9/46        (2006.01)
 G06F 15/173      (2006.01)
 G06F 9/50        (2006.01)

(52) U.S. Cl.
 CPC .................................. G06F 9/5083 (2013.01)

(58) Field of Classification Search
 None
 See application file for complete search history.

(56) References Cited

U.S. PATENT DOCUMENTS

| | | | |
|---|---|---|---|
| 5,537,319 A | 7/1996 | Schoen | |
| 5,991,695 A | 11/1999 | Wang et al. | |
| 7,196,969 B1 | 3/2007 | Karazincir | |
| 7,296,269 B2 | 11/2007 | Lin | |
| 7,590,984 B2 * | 9/2009 | Kaufman et al. | ............. 718/105 |
| 2004/0215904 A1 | 10/2004 | Gopisetty et al. | |
| 2006/0106938 A1 | 5/2006 | Dini et al. | |
| 2007/0117631 A1 | 5/2007 | Lim et al. | |

OTHER PUBLICATIONS

Devine et al., "New Challenges in Dynamic Load Balancing", Preprint Submitted to Elsevier Science.

* cited by examiner

*Primary Examiner* — Mengyao Zhe
*Assistant Examiner* — Bing Zhao
(74) *Attorney, Agent, or Firm* — Harrington & Smith

(57) ABSTRACT

Systems and techniques for computational load balancing. A problem space is partitioned into subspaces and the subspaces are assigned to processing nodes. The load of nodes associated with outer subspaces is compared with the load of nodes associated with inner subspaces, and partition boundary adjustments are made based on the relative loads of outer versus inner subspaces.

21 Claims, 5 Drawing Sheets

METHODS AND APPARATUS FOR PROCESSING LOAD BALANCING IN DISTRIBUTED PROBLEM PROCESSING

CROSS-REFERENCE TO RELATED APPLICATIONS

The present application is a continuation of U.S. patent Ser. No. 13/531,799, filed on 25 Jun. 2012.

FIELD OF THE INVENTION

One or more embodiments of the present invention relate generally to systems and techniques for data processing. More particularly, embodiments of the invention relate to load balancing among parallel processing nodes.

BACKGROUND

A number of endeavors are directed based on information provided collection of large and complex bodies of data, and for a number of these endeavors, data collection is complex and expensive. Because of the importance of the insights provided by the data in directing complex and costly endeavors, and because of the expense involved in collecting the data itself, it is important to process the data to yield an accurate representation conditions represented by the data. Processing of large bodies of data can be complex and expensive, as, for example, in the case of processing acoustic wave data to create images of subsurface features. In the case of the processing of seismic data, such as to create or analyze images for oil exploration, processing is divided among large numbers of processors, on the order of thousands. Such processing may take hours, and the use of such a large body of processors is expensive. It is important to balance the processing load as evenly as possible because if processors undergo excessive idle time, the processing time will increase. If some processors are idle, it is likely that other processors will be at their capacity, so naturally the whole assembly will not be processing as efficiently as it could be.

SUMMARY

In one embodiment of the invention, an apparatus comprises at least one processor and memory storing computer program code. Execution of the computer program code by the processor configures the apparatus to perform actions comprising at least examining a plurality of subspaces comprising partitions of a problem space, wherein each of the subspaces is assigned to a processing node, evaluating processor timing during at least one computational iteration by each of the processing nodes, determining relative load between nodes associated with outer subspaces and nodes associated with inner subspaces, and adjusting partitioning of at least one outer subspace based on relative load between nodes associated with outer subspaces and nodes associated with inner subspaces.

In another embodiment of the invention, a method comprises examining a plurality of subspaces comprising partitions of a problem space, wherein each of the subspaces is assigned to a processing node, evaluating processor timing during at least one computational iteration by each of the processing nodes, determining relative load between nodes associated with outer subspaces and nodes associated with inner subspaces, and adjusting partitioning of at least one outer subspace based on relative load between nodes associated with outer subspaces and nodes associated with inner subspaces.

In another embodiment of the invention, a computer readable medium stores a program of instructions. Execution of the program of instructions by a processor configures an apparatus to perform actions comprising at least examining a plurality of subspaces comprising partitions of a problem space, wherein each of the subspaces is assigned to a processing node, evaluating processor timing during at least one computational iteration by each of the processing nodes, determining relative load between nodes associated with outer subspaces and nodes associated with inner subspaces, and adjusting partitioning of at least one outer subspace based on relative load between nodes associated with outer subspaces and nodes associated with inner subspaces.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present invention recognize that load partitioning may be accomplished by dividing a problem space into a plurality of subspaces, and allocating each of the subspaces to a processor node. In an even partition of the problem space, the processor nodes assigned to corner and edge subspaces will have the greatest load because of the additional computation required by the boundary conditioning. In one or more embodiments of the present invention, therefore, corner and edge subspaces are reduced, suitably by fixed delta values, and the computing time of each processor node is monitored. If corner and edge nodes experience a greater processing time, their assigned subspaces are reduced, suitably by fixed delta values in one or more directions. Computation of the problem space is performed for one or more time steps and the computing time of each processor is monitored. If the corner and edge nodes continue to exhibit a greater load, their subspace is again reduced with the same delta values. The computing time is again monitored. If the corner and edge nodes now exhibit a smaller load, their subspace is increased, but with smaller delta values, such as one-half of the previous delta values. The process continues with the subspaces assigned to the corner and edge nodes being reduced or increased as appropriate, until the load on all the nodes is nearly the same, such as within a specified tolerance.

Figure 1A:
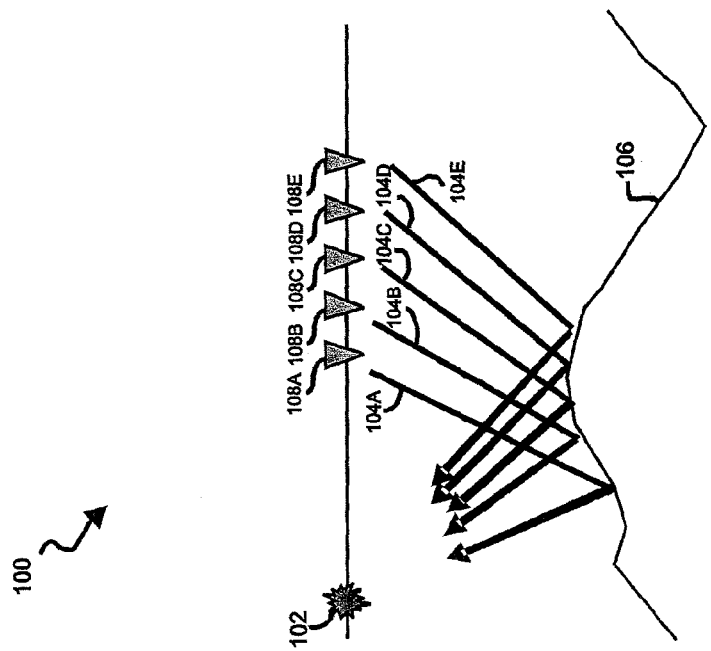
FIGS. 1A and 1B illustrate an operation for gathering data for processing, which may advantageously employ load balanced parallel processing according to an embodiment of the present invention.
Figure 1B:
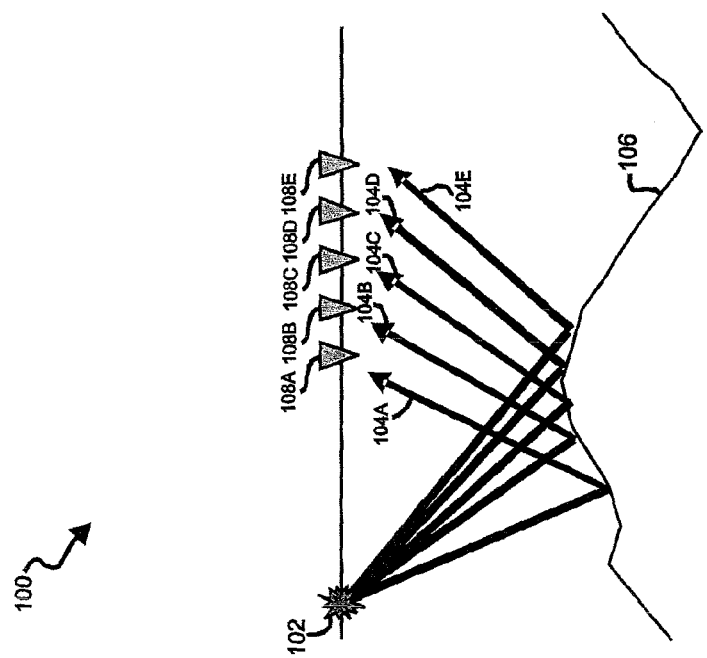

FIGS. 1A and 1B illustrate a scenario calling for parallel processing that may use load balancing according to one or more embodiments of the present invention. FIG. 1A illustrates forward path $P_S(x, y, z, t)$ of acoustic waves. A sound source 102 produces acoustic waves 104A-104E, which are reflected from the sea floor 106 and captured by receivers 110A-110E, deployed on the surface 110 of the water. The reflected waves are affected by subsurface features, and can be processed to yield insight into the subsurface features. The forward wave can be modeled by the equation $$\left[\partial_x^2 + \partial_y^2 + \partial_z^2 - \frac{1}{v^2(x, y, z)}\partial_t^2\right]P_S(x, y, z, t) = S(x, y, z, t).$$

FIG. 1B illustrates reverse path $P_R(x, y, z, t)$ of acoustic waves. The reverse path of the waves 104A-104E, from the receivers 108A-108E, to the sound source 102, is modeled by the equation $$\left[\partial_x^2 + \partial_y^2 + \partial_z^2 - \frac{1}{v^2(x, y, z)}\partial_t^2\right]P_R(x, y, z, t) = R(x, y, z, t).$$

Imaging is performed using the equation $I(x, y, z) = \Sigma_t P_S(x, y, z, t) P_R(x, y, z, t)$ The processing of the equations is performed through numerous steps, and involves multiple iterations of the following steps in an exemplary and non-limited embodiment:
Velocity model v(x,y,z)
Source & Receiver data
Forward Propagation
Calculate $P_S(x,y,z,t)$
Every N time steps (N=5~10)
   Compress $P_S(x,y,x,t)$
   Save $P_S(x,y,x,t)$
Reverse Propagation
Calculate $P_R(x,y,z,t)$
Every N time steps
   Retrieve $P_S(x,y,x,t)$
   Decompress $P_S(x,y,x,t)$
   Calculate partial sum of image I(x,y,z)
Merge I(x,y,z) with Global Image Such an approach performs calculations through numerous time steps for a single shot of the air cannon, and an air cannon is fired numerous times in data collection. The data storage typically requires many terabytes of storage and hours of processing time for each shot. Massively parallel processing is performed in order to manage the processing load, and one or more embodiments of the present invention provide for a fast and convenient mechanisms for balancing load among processors, so as to achieve efficient use of a processing assembly.

Figure 2:
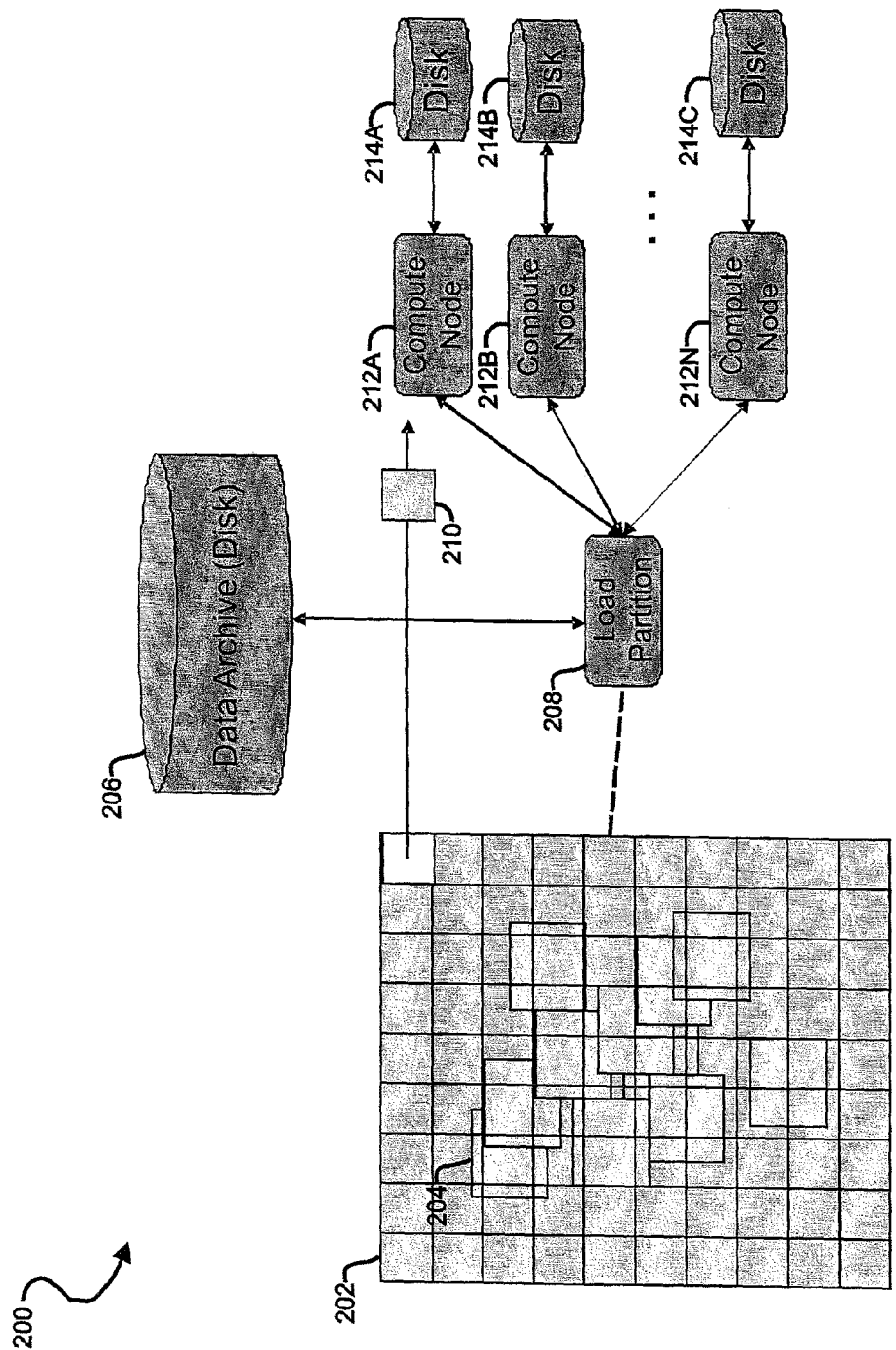
FIG. 2 illustrates a system for parallel processing that may employ load balancing according to an embodiment of the present invention.

FIG. 2 illustrates a system 200 for data processing that may employ load balancing mechanisms according to one or more embodiments of the present invention. The system 200 operates on a problem space 202 to process a model 204. The model 204 may be used to process data stored in a data archive 206, and the problem space 202 is partitioned into subspaces, such as by a load partition server 208. Initially the problem space 202 may be evenly partitioned. Each subspace, such as the subspace 210 is assigned to a processing node, such as the processing nodes 212A, 212B, ..., 212N, with each processing node employing storage such as the discs 214A, 214B, ..., 214N, respectively. With the problem space divided among many processors, all the data for a subspace can often be stored in the local memory of a processing node, thus eliminating a need for disc storage. Partitioning may be accomplished by separate processing resources from those devoted to the parallel processing operation. For example, the load partitioning server 208 may communicate remotely with processing nodes, and if desired, load partitioning resources may perform computations for multiple sets of processing nodes solving multiple problems. It will also be recognized that computations and adjustments for load partitioning may be performed by one or more processing nodes working on a problem, and that the specific deployment of processing resources to load balancing operations is a matter of design choice.

Figure 3B:
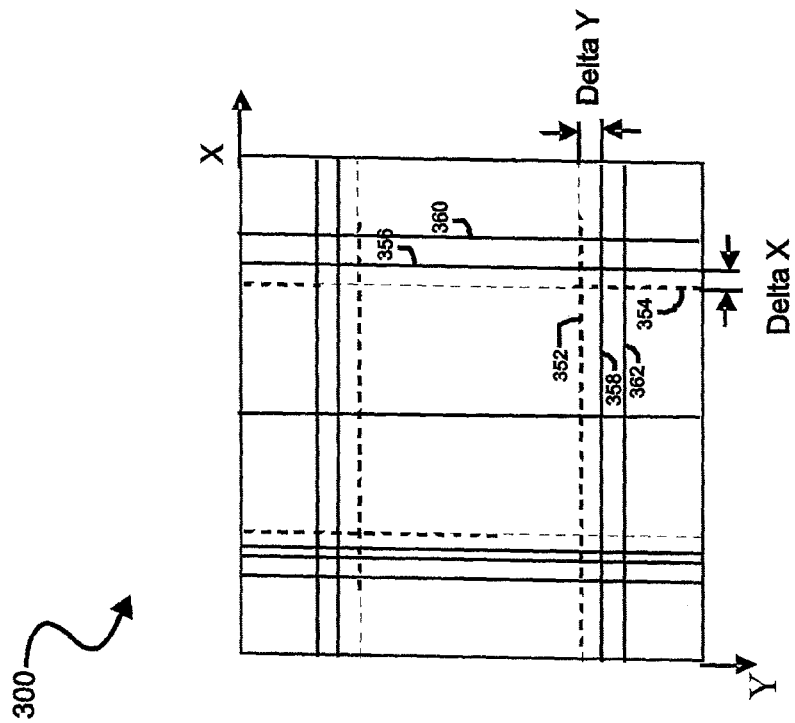
FIGS. 3A and 3B illustrates a problem space undergoing adjustments for load balancing according to an embodiment of the present invention.
Figure 3A:
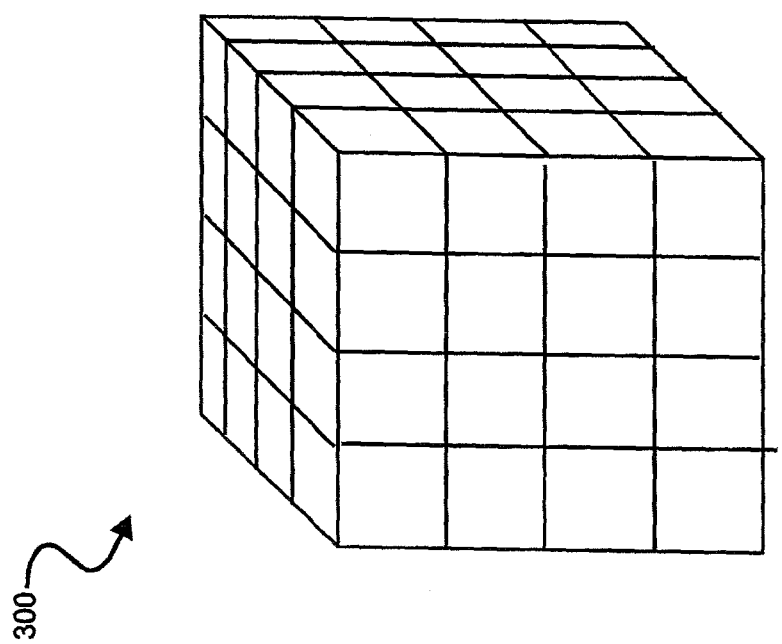

FIG. 3 illustrates a perspective view 300 and a top view 350 of an exemplary three-dimensional problem space 300. One subspace may be assigned to each processing node.

Mechanisms according to one or more embodiments of the present invention recognize that boundaries of a problem space experience greater load due to boundary conditioning. The top view 350 illustrates the subspaces assigned to each node, showing changes made to the outer subspaces based on overall load over the problem space. The lines 352 and 354 represent initial distributions for the corner and edge subspaces. Theses subspaces may be reduced without an evaluation based on the understanding that outer subspaces are subject to greater load in the initial distribution. Alternatively, the processing load for each node may be evaluated and the corner and edge subspaces reduced or increased depending on whether their nodes are more heavily loaded than are the nodes for the inside subspaces. In the present example, the adjustments are made by a delta X and a delta Y, and The lines 356 and 358 represent new distributions resulting from horizontal and vertical adjustments. The processor load is again evaluated, and if the corner and edge nodes are experiencing a greater load than are the inside nodes, the distributions are again adjusted by delta X and delta Y, with the new distributions being represented by the lines 360 and 362. If the corner and edge nodes are experiencing smaller loads than are the inside nodes, the distributions are adjusted in the opposite direction, but by a smaller delta than before. The process continues, with the direction being changed whenever the relative load between the corner and edge nodes and the inside nodes changes, and with the delta being changed whenever the direction changes. Adjustments can be made in one or in more than one direction, that is, in one, two, or all three of the X, Y, and Z directions, and different delta values can be used as desired.

Figure 4:
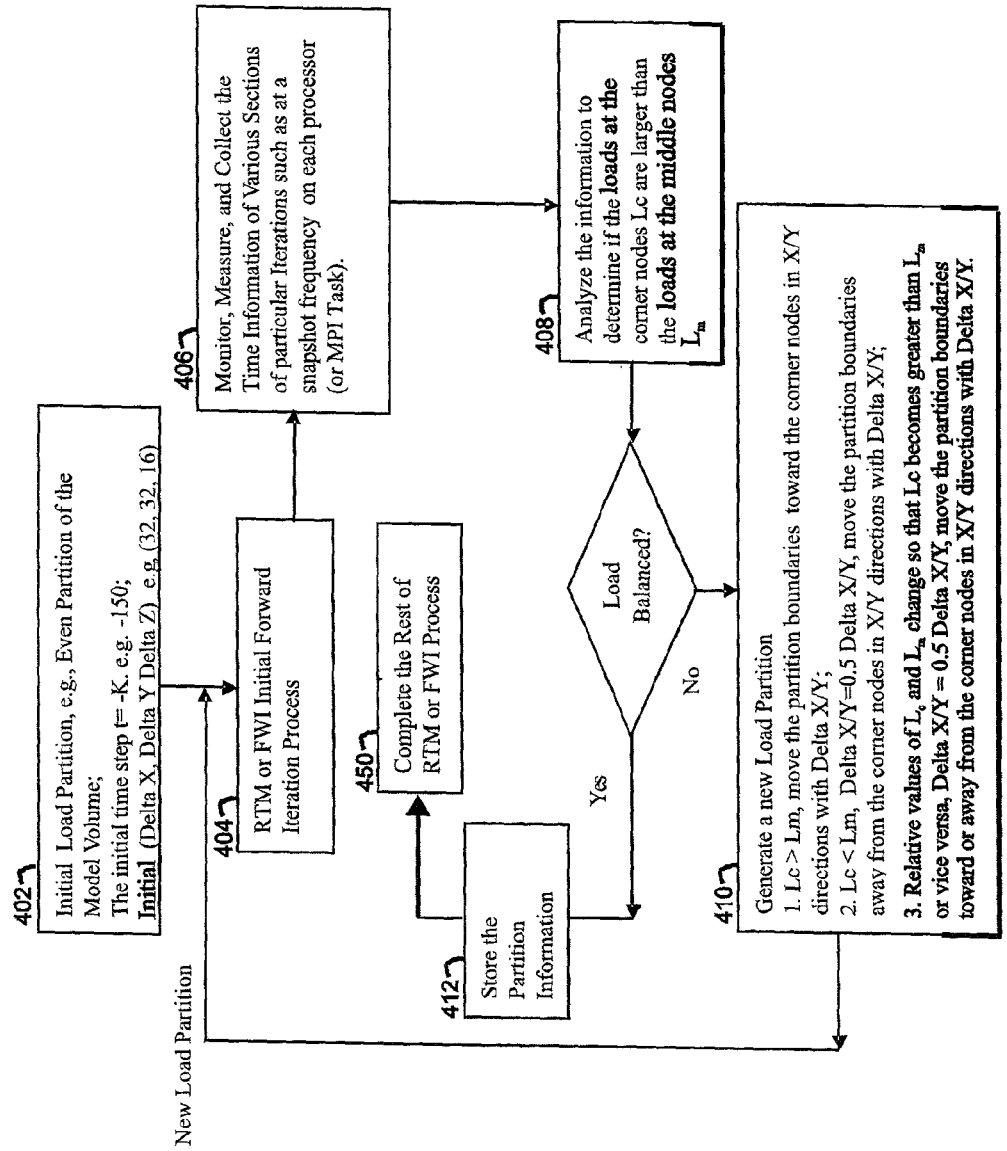
FIG. 4 illustrates a process according to an embodiment of the present invention.

FIG. 4 illustrates a process 400 of load balancing according to an embodiment of the present invention. At step 402, an initial load partition is created, such as an even partition of a problem space comprising a model volume. An initial time step t=−K, such as −150, may be established, and initial delta values may be established, for example, delta X, delta Y, and delta Z, with values of 32, 32, and 16, respectively. At step 404, an initial iteration process is performed—in the case of subsurface modeling, the process may be, for example, a reverse time migration (RTM) or forward wave iteration (FWI) process. At step 406, information is monitored, measured and collected indicating processor load. Such information may, for example, comprise time information for various sections of particular iterations, such as a snapshot frequency. The information may be collected for each processor or message passing interface (MPI) task. At step 408, the information is analyzed to determine if the loads at the corner nodes $L_c$ are larger than the loads at the middle nodes $L_m$. If the load is unbalanced, the process proceeds to step 410 and a new partition is created. If $L_c > L_m$, the partition boundaries are moved toward the corner nodes in X and Y directions with the movement being in increments of delta X and delta Y. If $L_c < L_m$, new delta values are created, such as half of the previous delta X and delta Y, and the partition boundaries are moved away from the corner nodes in the X and Y directions with the movement being in increments of the new delta X and delta Y. The process then returns to step 404.

If the load is balanced, the process proceeds to step 412 and the partition information is stored. The process proceeds to step 450 and the data modeling process is completed.

Figure 5:
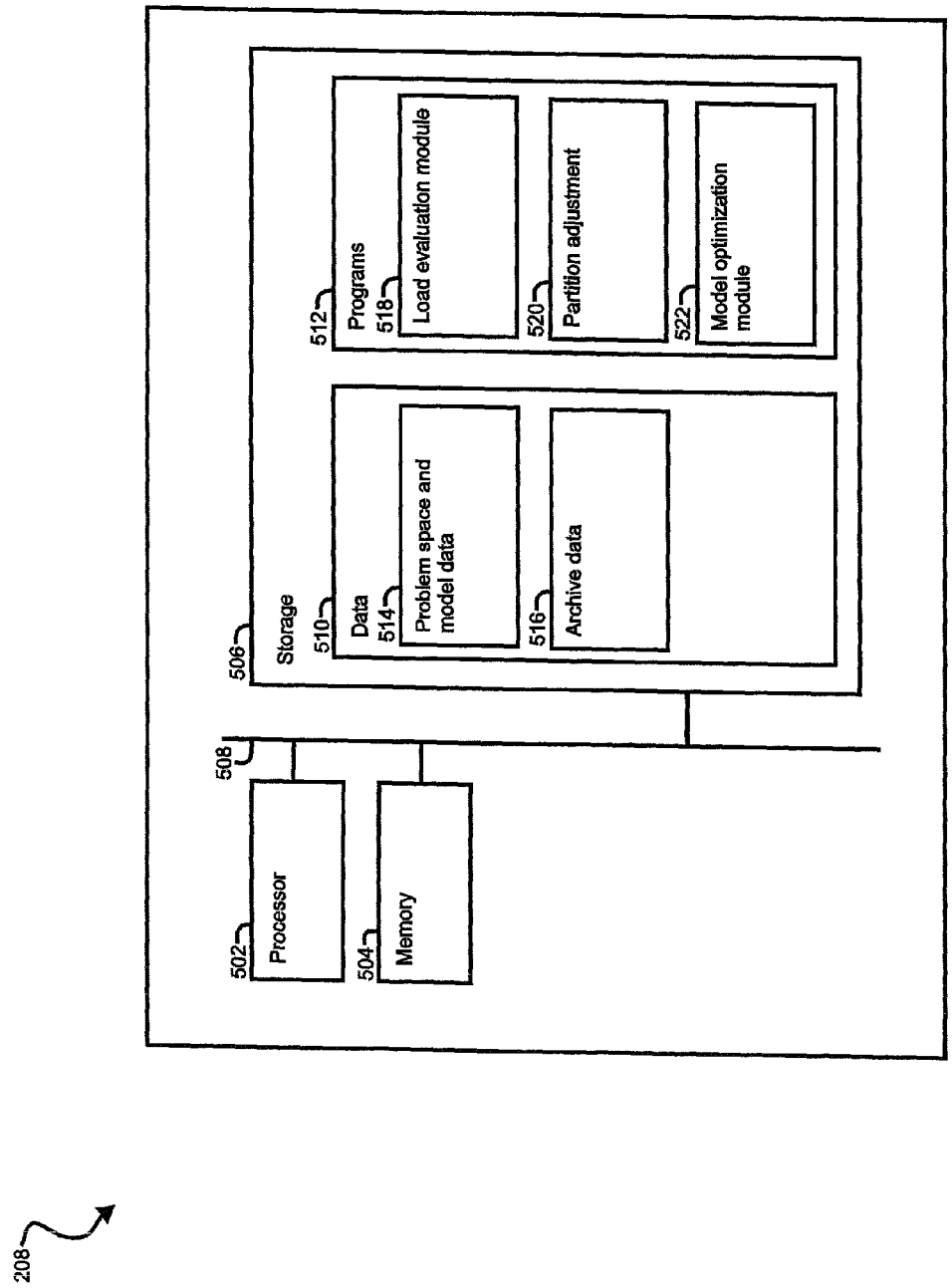
FIG. 5 illustrates additional details of a device for carrying out load balancing according to an embodiment of the present invention.

FIG. 5 illustrates additional details of the load partition server 208 of FIG. 2. The server 208 comprises a processor 502, memory 504, and storage 506, communicating over a bus 508. The server 208 may also employ data 510 and programs 512, residing in storage 506 and transferred to memory 504 as needed for execution by the processor 502. Included in the data 510 may be problem space and model data 514, as well as archive data 516. The problem space and model data 514 and archive data 516 may be used to evaluate and adjust load partitioning. The server 208 suitably has access to the problem space 202, the archive 206, and each of the nodes 212A, . . . , 212N.

The server 208 may also employ a load evaluation module 518 and a partition adjustment module 520. The load evaluation module 518 may examine processor timing data for specified iterations of a computation process performed by each of the processor nodes. The partition adjustment module 520 adjusts the partitioning between corner and edge nodes and center nodes based on determinations made by the load evaluation module 518. The exemplary modules 518 and 520 may cause the carrying out of operations such as those described above in relation to the process 400 of FIG. 4, and it will be recognized that the specific modules and functions and combinations of functions carried out by these modules, and the operations carried on as part of the process 400 are exemplary, and that numerous other configurations of a server such as the server 208 may be employed. The specific data, and operation carried on that data, in connection with which load balancing is discussed in connection with the process 400 of FIG. 4, is just one example, and it will be recognized that numerous activities employing different types of data may use the principles discussed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Advantages of the Invention

Various embodiments of the present invention improve over the prior art by balancing processing load for a problem space by adjusting partitioning between outer and inner subspaces of a problem space. A recursive operation is performed whereby a partition boundary is adjusted inward if outer subspaces are experiencing a greater load than are inner subspaces, with the adjustment increment being a predetermined value. Such an approach allows for adjustment based on observations without prior hardware or software knowledge and provides for low overhead with the load balancing being able to be performed at initialization. The balancing can be performed using bisection searching, and allows for reduction of time and costs in operations that are typically complex, costly, and time consuming.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

We claim:

1. An apparatus comprising:
   at least one processor;
   memory storing computer program code;
   wherein the memory storing the computer program code is configured to, with the at least one processor, cause the apparatus to at least:
   examine a plurality of subspaces comprising partitions of a problem space, wherein each partition of a subspace is a portion of the problem space to be assigned to a processing node, wherein the subspaces comprise outer and inner subspaces, wherein outer subspaces are subspaces in the vicinity of outer boundary regions of a problem space and inner subspaces are subspaces away from the vicinity of outer boundary regions of a problem space, and wherein each of the subspaces is assigned to a processing node;
   evaluate processing time during at least one computational iteration by each of the processing nodes;
   determine, based at least in part on the evaluating, relative load between the nodes associated with outer subspaces as compared to the nodes associated with inner subspaces; and
   independently adjust partitioning of at least one outer subspace based on relative load between nodes associated with outer subspaces and nodes associated with inner subspaces by expanding or contracting the boundary of the at least one outer subspace by a predetermined value.

2. The apparatus of claim 1, wherein the at least one outer subspace comprises a corner subspace, wherein a corner subspace is an outer subspace in the vicinity of more than one boundary of the problem space.

3. The apparatus of claim 1, wherein the at least one outer subspace comprises an edge subspace, wherein an edge subspace is an outer subspace in the vicinity of one boundary of the problem space.

4. The apparatus of claim 1, wherein adjusting partitioning comprises adjusting partitioning in at least two directions simultaneously.

5. The apparatus of claim 1, wherein adjusting partitioning comprises adjusting partitioning by a predetermined value in at least one direction.

6. The apparatus of claim 5, wherein adjusting partitioning comprises adjusting partitioning by a predetermined value in at least two directions.

7. The apparatus of claim 6, wherein the same predetermined value is used for each direction.

8. The apparatus of claim 6, wherein a different predetermined value is used for each direction.

9. The apparatus of claim 1, wherein adjusting partitioning comprises adjusting a partition boundary toward an inner subspace if the node associated with the outer subspace is experiencing a greater load than is a node associated with an inner subspace.

10. The apparatus of claim 1, wherein adjusting partitioning comprises adjusting a partition boundary toward the outer subspace if the node associated with the outer subspace is experiencing a lesser load than is a node associated with an inner subspace.

11. The apparatus of claim 5, wherein adjusting partitioning comprises reducing the predetermined value and reversing a direction of partition adjustment if a relative load between outer and inner nodes has changed if determining relative load between nodes shows that the load of the at least one outer subspace has changed so as to become smaller than or larger than the load of an inner subspace since a previous determination of relative load between nodes.

12. A non-transitory computer readable medium storing a program of instructions, execution of which by a processor configures an apparatus to at least:
    examine a plurality of subspaces comprising partitions of a problem space, wherein each partition of a subspace is a portion of the problem space to be assigned to a processing node, wherein the subspaces comprise outer and inner subspaces, wherein outer subspaces are subspaces in the vicinity of outer boundary regions of a problem space and inner subspaces are subspaces away from the vicinity of outer boundary regions of a problem space, and wherein each of the subspaces is assigned to a processing node;
    evaluate processor timing during at least one computational iteration by each of the processing nodes;
    determine, based at least in part on the evaluating, relative load between the nodes associated with outer subspaces as compared to the nodes associated with inner subspaces; and
    independently adjust partitioning of at least one outer subspace based on relative load between nodes associated with outer subspaces and nodes associated with inner subspaces by expanding or contracting the boundary of the at least one outer subspace by a predetermined value.

13. The non-transitory computer readable medium of claim 12, wherein the at least one outer subspace comprises a corner subspace, wherein a corner subspace is an outer subspace in the vicinity of more than one boundary of the problem space.

14. The non-transitory computer readable medium of claim 12, wherein the at least one outer subspace comprises an edge subspace, wherein an edge subspace is an outer subspace in the vicinity of one boundary of the problem space.

15. The non-transitory computer readable medium of claim 12, wherein adjusting partitioning comprises adjusting partitioning in at least two directions simultaneously.

16. The non-transitory computer readable medium of claim 12, wherein adjusting partitioning comprises adjusting partitioning by a predetermined value in at least one direction.

17. The non-transitory computer readable medium of claim 16, wherein adjusting partitioning comprises adjusting partitioning by a predetermined value in at least two directions.

18. The non-transitory computer readable medium of claim 17, wherein the same predetermined value is used for each direction.

19. The non-transitory computer readable medium of claim 17, wherein a different predetermined value is used for each direction.

20. The non-transitory computer readable medium of claim 12, wherein adjusting partitioning comprises adjusting a partition boundary toward an inner subspace if the node associated with the outer subspace is experiencing a greater load than is a node associated with an inner subspace.

21. The non-transitory computer readable medium of claim 12, wherein adjusting partitioning comprises adjusting a partition boundary toward the outer subspace if the node associated with the outer subspace is experiencing a lesser load than is a node associated with an inner subspace.

* * * * *